(12) United States Patent
Kim et al.

(10) Patent No.: US 12,378,162 B2
(45) Date of Patent: Aug. 5, 2025

(54) NANO INORGANIC COMPOSITION AND COATING METHOD USING SAME

(71) Applicants: WELLTURE FINETECH CO., LTD., Daejeon (KR); EVERCOAT CO., LTD., Daejeon (KR)

(72) Inventors: Heegon Kim, Daejeon (KR); Namsoo Kim, Daejeon (KR); Byungjun Kim, Chungcheongbuk-do (KR)

(73) Assignees: WELLTURE FINETECH CO., LTD., Daejeon (KR); EVERCOAT CO., LTD, Daejeon (KR)

( * ) Notice: Subject to any disclaimer, the term of this patent is extended or adjusted under 35 U.S.C. 154(b) by 814 days.

(21) Appl. No.: 17/603,154

(22) PCT Filed: Apr. 2, 2020

(86) PCT No.: PCT/KR2020/004508
§ 371 (c)(1),
(2) Date: Oct. 12, 2021

(87) PCT Pub. No.: WO2020/209544
PCT Pub. Date: Oct. 15, 2020

(65) Prior Publication Data
US 2022/0194857 A1 Jun. 23, 2022

(30) Foreign Application Priority Data
Apr. 11, 2019 (KR) .................. 10-2019-0042720
Apr. 11, 2019 (KR) .................. 10-2019-0042723

(51) Int. Cl.
| | | |
|---|---|---|
| B05D 1/02 | (2006.01) | |
| B05D 3/00 | (2006.01) | |
| C04B 35/01 | (2006.01) | |
| C04B 35/626 | (2006.01) | |
| C09D 1/00 | (2006.01) | |
| C09D 1/06 | (2006.01) | |
| B82Y 30/00 | (2011.01) | |
| B82Y 40/00 | (2011.01) | |

(52) U.S. Cl.
CPC ............ *C04B 35/01* (2013.01); *B05D 1/02* (2013.01); *B05D 3/002* (2013.01); *C04B 35/626* (2013.01); *C09D 1/00* (2013.01); *C09D 1/06* (2013.01); *B82Y 30/00* (2013.01); *B82Y 40/00* (2013.01); *C03C 2217/23* (2013.01); *C03C 2217/75* (2013.01); *C03C 2217/78* (2013.01); *C04B 2235/3201* (2013.01); *C04B 2235/3203* (2013.01)

(58) Field of Classification Search
CPC ........... C04B 35/01; C04B 35/626; C04B 2235/3201; C04B 2235/3203; C04B 2235/447; C04B 2235/486; C04B 2235/96; C04B 2235/963; C04B 35/16; C04B 35/62222; C04B 2235/32; C04B 35/2616; C04B 35/6224; B05D 1/02; B05D 3/002; B05D 3/00; C09D 1/00; C09D 1/06; C09D 1/04; C09D 1/02; B82Y 30/00; B82Y 40/00; C03C 2217/23; C03C 2217/75; C03C 2217/78; C03C 2218/31; C03C 2218/32; C03C 17/25; C03C 2217/00; C03C 17/00; C03C 17/02; C03C 17/22; C03C 17/23
See application file for complete search history.

(56) References Cited

U.S. PATENT DOCUMENTS

2015/0291801 A1* 10/2015 Kim .................. B05D 1/28
106/629

FOREIGN PATENT DOCUMENTS

| JP | 2000-070796 A | 3/2000 | |
|---|---|---|---|
| JP | 2000203883 A * | 7/2000 | ............ C03C 17/25 |
| JP | 2009-001685 A | 1/2009 | |
| JP | 2014-030786 A | 2/2014 | |
| KR | 10-2014-0063447 A | 5/2014 | |
| KR | 10-2018-0107823 A | 10/2018 | |

OTHER PUBLICATIONS

JP-2000203883-A, machine translation (Year: 2000).*
International Search Report for PCT/KR2020/004508 mailed on Jul. 22, 2020.

* cited by examiner

*Primary Examiner* — Bryan D. Ripa
*Assistant Examiner* — Marites A Guino-O Uzzle
(74) *Attorney, Agent, or Firm* — The PL Law Group, PLLC (57) ABSTRACT

A nano-inorganic composition according to an embodiment of the present disclosure includes and is not limited to excellent mechanical characteristics such as surface hardness and wear characteristics, chemical stability such as water resistance, acid resistance, and alkali resistance, and excellent thermal stability, as the composition is comprised of inorganic materials. In addition, the nano-inorganic composition may be controlled to have super-hydrophilic, hydrophilic, or hydrophobic properties, depending on coating methods. The nano-inorganic composition also has excellent surface contamination resistance and easy-clean properties depending on the characteristics of the thin film coating. Also, the nano-inorganic composition has excellent optical properties such as light transmittance and light reflectance.

4 Claims, 10 Drawing Sheets

Oil Pen Test​ ​ ​ ​ ​ Easy Clean Effect

NANO INORGANIC COMPOSITION AND COATING METHOD USING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/004508, filed Apr. 2, 2020, which claims priority to the benefit of Korean Patent Application Nos. 10-2019-0042720 filed on Apr. 11, 2019 and 10-2019-0042723 filed on Apr. 11, 2019 in the Korean Intellectual Property Office, the entire contents of which are incorporated herein by reference.

BACKGROUND

1. Technical Field

The present application relates to a method of manufacturing a highly functional nano-inorganic composition and forming a fine-sized thin film using the nano-inorganic composition. The high functionality of the nano-inorganic composition includes, and is not limited to excellent mechanical characteristics such as surface hardness and wear characteristics, chemical such stability as water resistance, acid resistance, and alkali resistance, and excellent thermal stability, as the composition is comprised of inorganic materials. In addition, the nano-inorganic composition may be controlled to have super-hydrophilic, hydrophilic, or hydrophobic properties, depending on the desired characteristics of the manufactured composition. The nano-inorganic composition also has excellent surface contamination resistance and easy-clean properties depending on the characteristics of the thin film coating. Lastly, the nano-inorganic composition has excellent optical properties such as light transmittance and light reflectance.

In one embodiment, the present application relates to composition with excellent a nano-inorganic coating properties such as high strength, smooth surface, surface with a gloss or matte finish, sophisticated exterior, adhesion, weather resistance, durability, surface polish, contamination resistance, chemical resistance, self-purification characteristics, and super-hydrophilicity and a method of coating a surface using the nanoparticulated coating composition for various purposes (e.g., merchandising).

2. Background Art

In general, an inorganic paint and an inorganic ceramic coating composition, compared to an organic paint or an organic coating composition, have excellent physical properties such as heat resistance, weather resistance, stain resistance, chemical resistance, and durability. Nano-coating technology using an inorganic composition has been used to form a thin film of nano-scale thickness using expensive equipment such as CVD or sputtering equipment, in the fields of high-precision technology such as semiconductors and displays. However, with the recent development of nanomaterials, research and development are being conducted so that a coating of nanometer-scale thickness may be formed using more generally available coating methods.

In particular, Fine-Coat (FC) coating agent, developed by Wellture FineTech Co., Ltd., employs a material comprised of nanoparticles (with a size from several nanometers to several tens of nanometers) and enables a coating of nanometer-scale thickness through a variety of coating methods such as a typical spray coating method, a spin coating method, a bar coating method, a slot die coating method, and a coating method using a sponge and/or a brush. Korea Registered Patent No. 10-1735383 discloses an inorganic paint composition and a method for forming inorganic paint film by using the inorganic paint composition.

However, nano-inorganic materials disclosed in prior art have a solid content around tens of wt % or greater and form a coating with a thickness of hundreds to thousands of nanometers. As a result, typical coating methods using such nano-inorganic materials may cause problems including, and not limited to, 1) efflorescence during coating and 2) microcracks created during thermal treatment. In addition, because of the excessive solid content, it is difficult to create a smooth coating with a thickness of tens of nanometers.

Especially, when the coating is thick, defects inside the coating layer may be readily created, and the formation of an air layer during the heat treatment process is facilitated, resulting in a rapid decrease in durability through such defective parts. In addition, it was found that coating films formed with materials of prior art have many differences in functional aspects.

SUMMARY

To solve the problems mentioned above, the present application reduced the amount of solid content in the composition to 10 wt % or less and increased the amount of water (or solvent) accordingly. This enabled a formation of a uniform coating film with a thickness of tens of nanometers even by a typical coating (or coating film formation) method. In addition, the present application reduced efflorescence that occurs during coating formation and increased the durability of the coating film.

In addition, by reducing the coating thickness to tens of nanometers, the formation of an air layer in the coating film is suppressed. The primary heat treatment (drying) temperature is lowered from 110° C. to 90° C., and as a result, the formation of an air layer due to vaporization of water from temperature rise is minimized, reducing defects and improving durability.

In addition, when the thickness is lowered to tens of nanometers as described above and the smoothness is improved, optical properties of the coating film such as light transmittance and light reflectance improved more than twice as high, and efflorescence caused by leaching of metal oxides can be solved.

Regardless of base material, a coating film formed using the nano-inorganic composition disclosed in the present application has 1) excellent mechanical characteristics such as surface hardness, wear characteristics, and adhesion, 2) significant chemical stability including strong acid resistance and strong base resistance, 3) excellent heat and flame resistance due to the inorganic nature of the coating, 4) (available depending on the intended use) fogging prevention due to super-hydrophilicity and stain resistance due to easy-clean characteristics, 5) excellent optical and acoustic properties, 6) human suitability (i.e., harmless to the human body) and antibacterial characteristics, and 7) environmentally friendly characteristics as water is used as a solvent, and coated surfaces do not use organic synthetic materials such as detergent.

The nano-inorganic composition having various characteristics as described above,
comprises at least one of sodium oxide ($Na_2O$), potassium oxide ($K_2O$), and lithium oxide ($Li_2O$), all of which are alkali metal oxide ($M_2O$); an inorganic acid compound; and water ($H_2O$), as represented by Formula 1, wherein Formula 1 is $(x_1Na_2O+x_2K_2O+x_3Li_2O)\cdot ySiO_2\cdot nH_2O$, wherein X is the number of moles of alkali metal oxide; X>0; $X=x_1+x_2+x_3$; $x_1, x_2, x_3>=0$; and $x_1<=x_2+x_3$, wherein y is the number of moles of silica; and y>=X.

The nano-inorganic composition represented by Formula 1 is manufactured such that the composition comprises 0.1-10 parts by weight of ($M_2O+ySiO_2$), 0.01-2 parts by weight of the inorganic acid compound, and water for the remainders.

In addition, various coating methods may be used to solve the above-mentioned problems. The present application shows through experiments that 1) for a transparent substrate such as glass, slot die and bar coating methods may be used to form a uniform coating with a thickness of tens of nanometers with ease, and 2) for a substrate that needs either a matte or glossy surface or a translucent or opaque surface through haze, the spray coating method is shown to be one of the most effective means.

Regardless of the type of a substrate, the inorganic film formed from the nano-inorganic composition disclosed in the present application shows strong adhesion and bonding to the substrate, as the inorganic film has a strong binding force to both metal and nonmetal surfaces. Such an inorganic coating film does not detach from the substrate even after a long time.

In addition, the inorganic coating film is a film with strong hydrophilic and properties, is not easily contaminated by organic pollutants thanks to the film's weak binding force to organic materials. Furthermore, organic pollutants as well as other pollutants can be readily removed using only water. In other words, one can easily remove pollutants from the inorganic film merely by washing the surface of the coating film with water, without any other additional works.

In addition, due to the nature of the inorganic coating film, the nano-inorganic composition has excellent weather resistance, chemical resistance, durability, hardness of the surface, far abrasion resistance, high infrared (FIR) radiation, nonflammability, and corrosion resistance. In the present application, the nano-inorganic composition and the inorganic coating film using the composition are provided.

In addition, since water is used as a solvent, pollutants are not generated in the manufacturing process of the composition and the coating process. The nano-inorganic composition is environment-friendly, and its life is semi-permanent.

DETAILED DESCRIPTION

The nano-inorganic composition and the coating method using the same according to embodiments of the present application are described in detail below.

The nano-inorganic composition of the present application comprises at least one of sodium oxide ($Na_2O$), potassium oxide ($K_2O$), and lithium oxide ($Li_2O$), all of which are alkali metal oxide ($M_2O$); an inorganic acid compound; and water ($H_2O$), as represented by Formula 1, wherein Formula 1 is $(x_1Na_2O+x_2K_2O+x_3Li_2O)\cdot ySiO_2\cdot nH_2O$, wherein X is the number of moles of alkali metal oxide; X>0; $X=x_1+2+x_3$; $x_1, x_2, x_3>=0$; and $x_1<=x_2+x_3$, wherein y is the number of moles of silica; and y>=X, wherein n is the number of moles of water; and n is a natural number from 1 to 20.

The nano-inorganic composition according to Formula 1 is manufactured such that the composition comprises 0.1-10 parts by weight of ($M_2O+ySiO_2$), 0.01-2 parts by weight of the inorganic acid compound, and water for the remainders.

In other words, the nano-inorganic composition according to Formula 1 (($x_1Na_2O+x_2K_2O+x_3Li_2O)\cdot ySiO_2\cdot nH_2O$) comprises 0.1-10 parts by weight of alkali metal silicate ($M_2O+ySiO_2$), 0.01-2 parts by weight of the inorganic acid compound, and the remaining parts by weight of water as a solvent. For the inorganic acid compound, boric acid and/or phosphoric acid is selected.

The composition as represented by Formula 1 may further comprise a dispersant, a catalyst, and/or a surfactant, depending on desired functions, coating methods, and/or coating apparatus.

One or more changes to the composition according to the coating apparatus may be applied depending on the pretreatment equipment. For example, the nano-inorganic composition may further comprise 1) a surfactant, depending on the hydrophilicity/hydrophobicity of the substrate surface, to improve adhesion properties, 2) a dispersant to improve dispersion of colored pigments and achieve high color intensity, and/or 3) a catalyst to shorten the production time of the composition and catalyze chemical reactions.

The amount of the solvent (water+inorganic acid compound) added is greater than what is required to dissolve the entire amount of the alkali metal oxide added (i.e., the solubility of the alkali metal oxide for the solvent), and in an embodiment of the present application, the inorganic acid compound may be phosphoric acid and/or boric acid.

The nano-inorganic compound of the present application may be manufactured to comprise one, two, or all of three of $x_1Na_2O$, $x_2K_2O$, and $x_3Li_2O$, as represented by Formula 1. In other words, the compound comprises at least one of the alkali metal oxides represented by Formula 1 so that the nano-inorganic compound has an improved adhesive force or bonding force to the substrate and high functionality including easy-clean properties (self-purification), anti-pollution, water resistance, and improved mechanical and chemical properties of the coating thin film.

In Formula 1 of the present application, X is the number of moles of alkali metal oxide ($M_2O$) included in the nano-inorganic composition, and y is the number of moles of silica ($SiO_2$). The number of moles of silica is always greater than or equal to the number of moles of alkali metal, and y>=X must be satisfied. $x_1$ is the number of moles number of sodium oxide ($Na_2O$), $x_2$ is the number of moles of potassium oxide ($K_2O$), and $x_3$ is the number of moles of lithium oxide ($Li_2O$). Accordingly, $X=x_1+x_2+x_3$, and X is always greater than 0 and satisfies X>0. The number of moles of each alkali oxide metal can be expressed as $x_1$, $x_2$, and $x_3$, and they are greater than or equal to 0 (i.e., $x_1$, $x_2$, $x_3$>=0).

Figure 1:
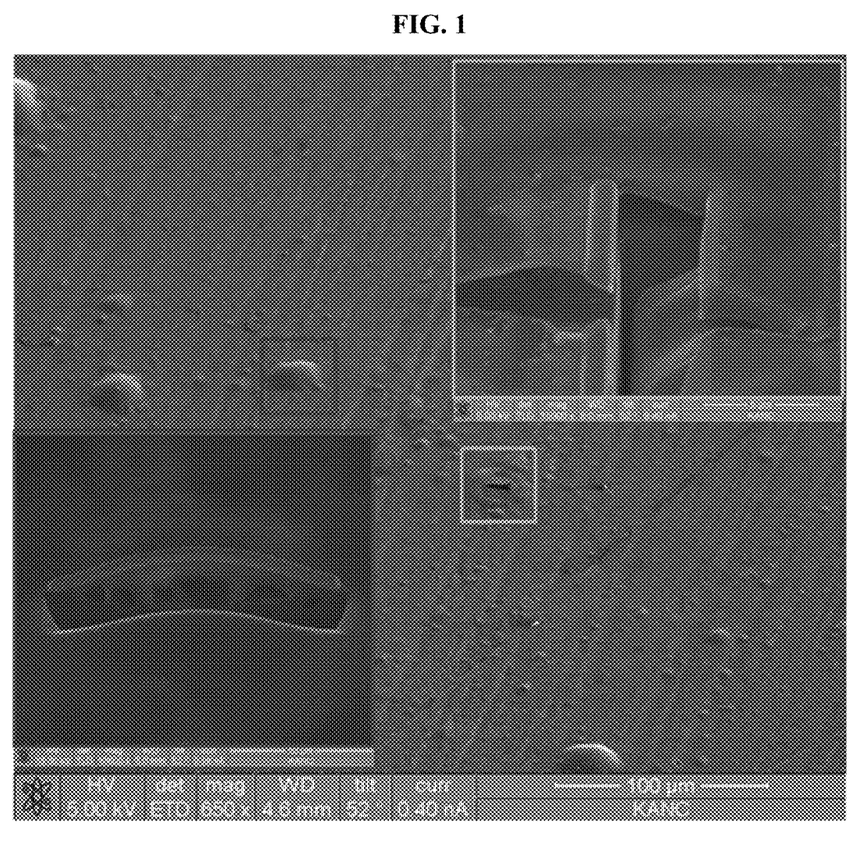
FIG. 1 shows defective parts and air layers formed inside the coating film of prior art.
Figure 2:
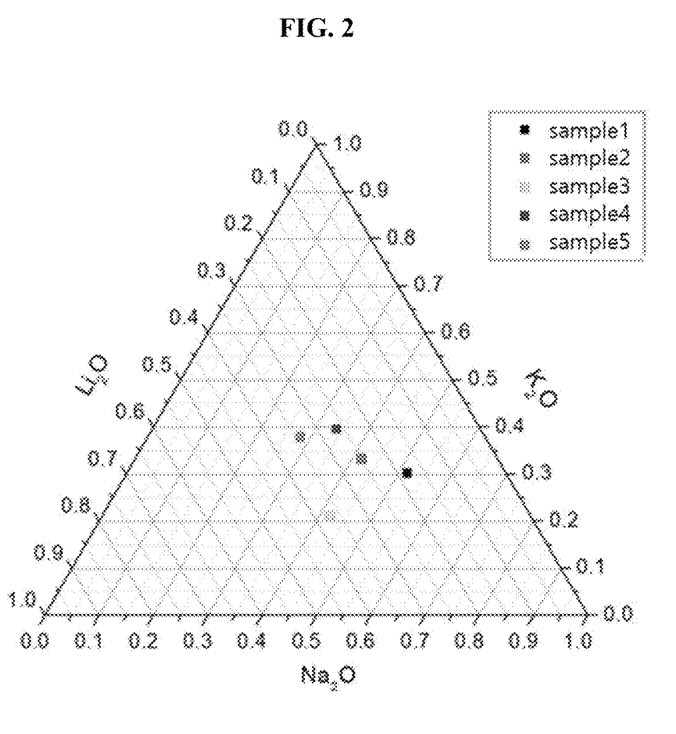
FIG. 2 shows a triangulation analysis diagram according to an embodiment of the present application.
Figure 3:
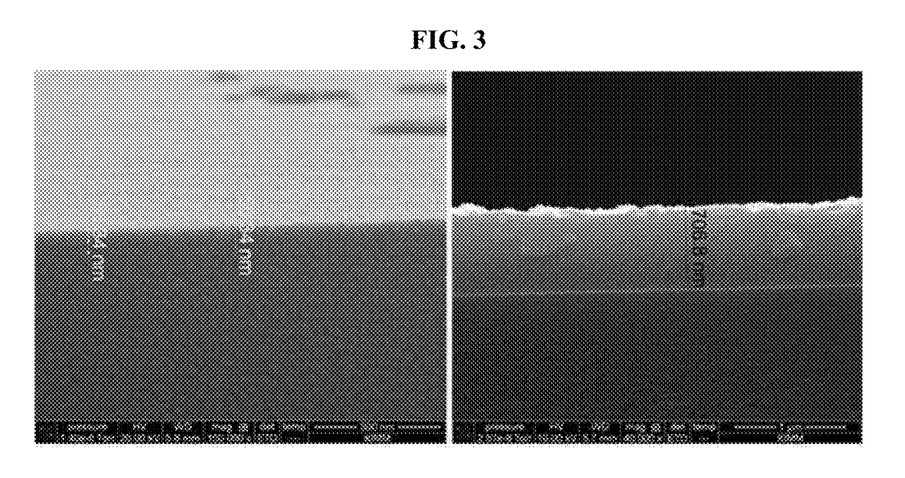
FIG. 3 shows an electron microscope (EM) image of a coating film showing the film thickness, according to an embodiment of the present application.
Figure 4:
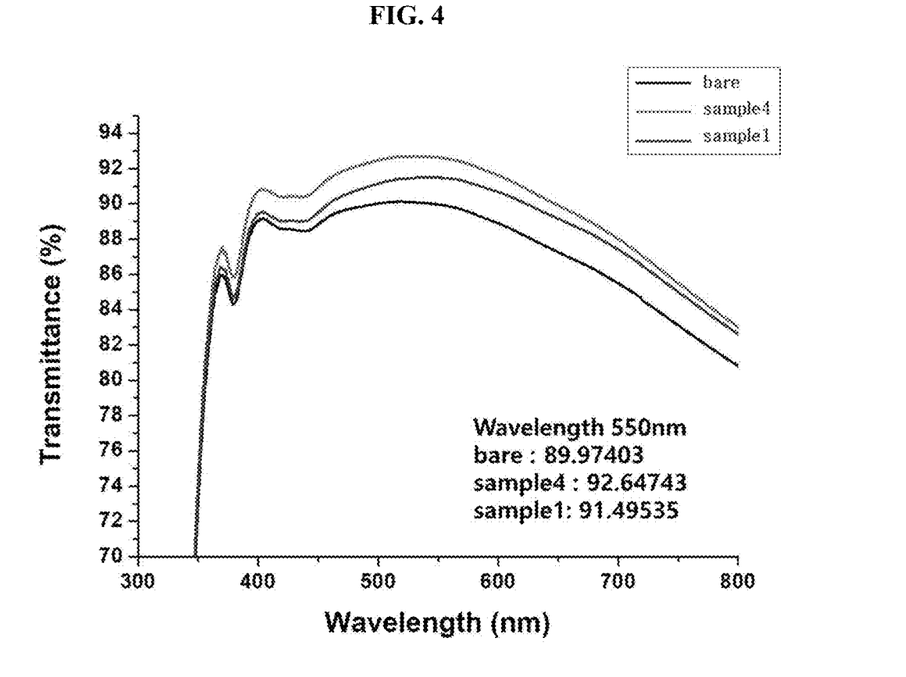
FIG. 4 shows light transmittance characteristics according to an embodiment of the present application.
Figure 5:
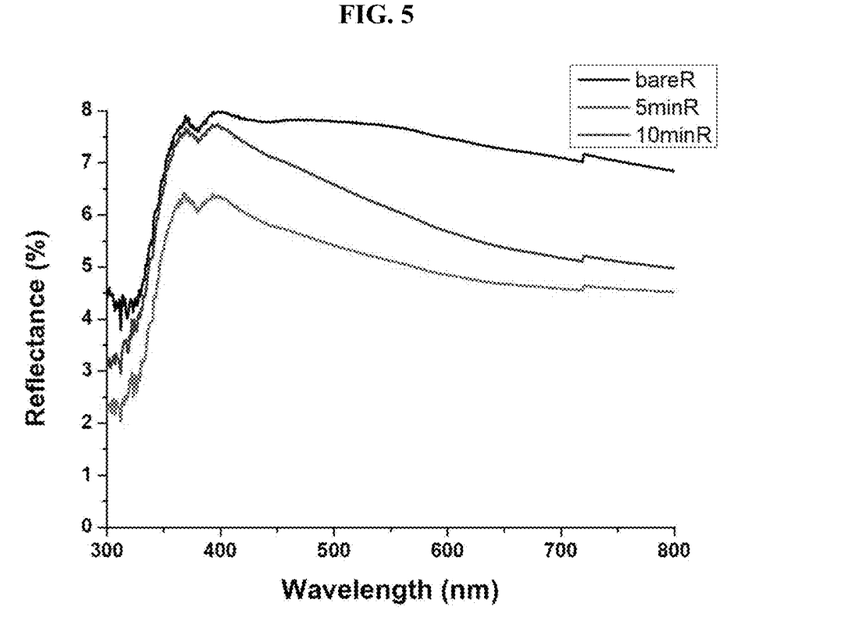
FIG. 5 shows light reflectance characteristics according to an embodiment of the present application.
Figure 6:
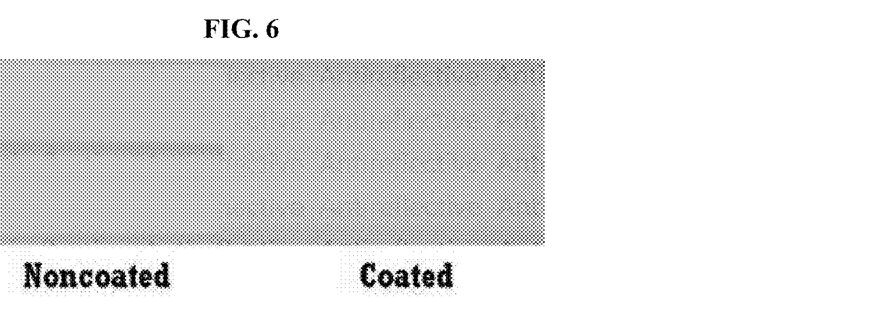
FIG. 6 shows readability characteristics in view of light reflectance properties of an embodiment of the present application.
Figure 8:
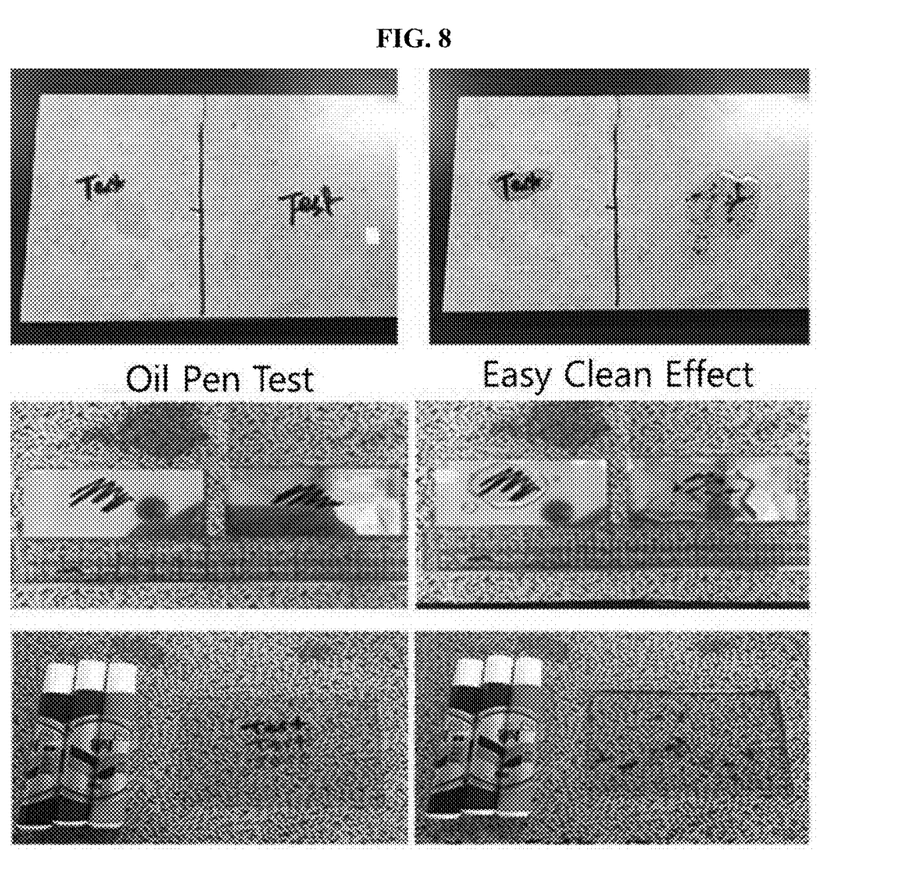
FIG. 8 shows testing of easy-clean characteristics of the coating surface according to an embodiment of the present application.
Figure 9:
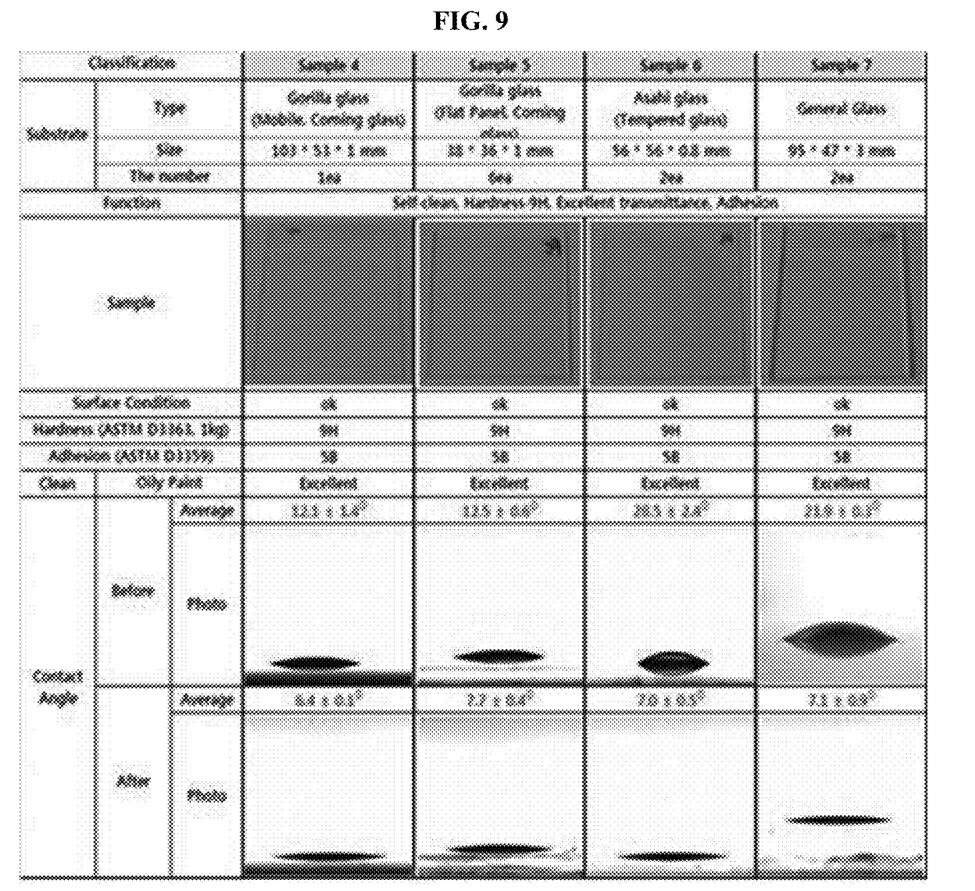
FIG. 9 shows measuring contact angles of different coating surfaces according to an embodiment of the present application.
Figure 10:
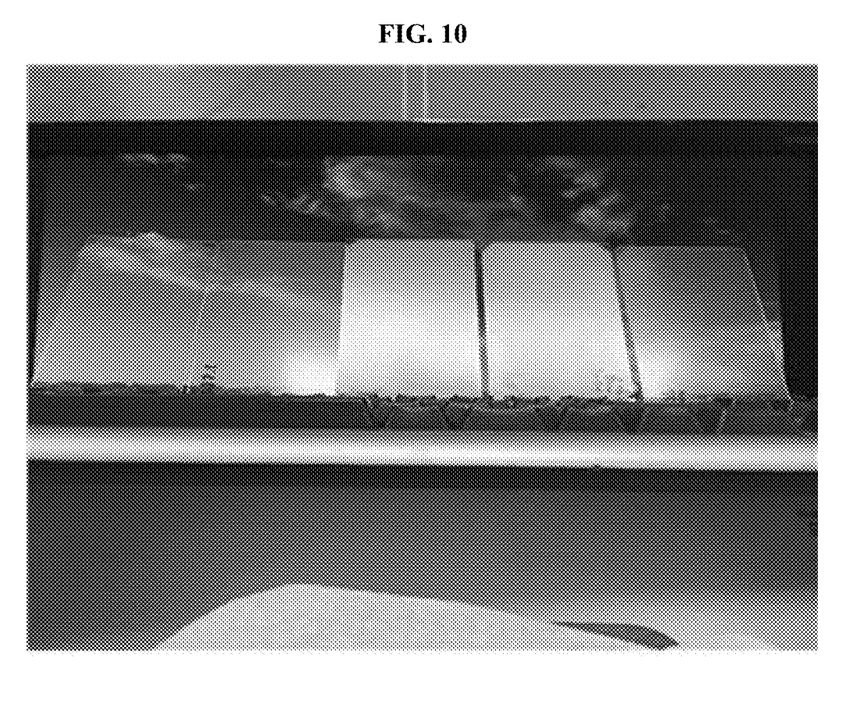
FIG. 10 shows haze (turbidity) according to an embodiment of the present application.
Figure 11:
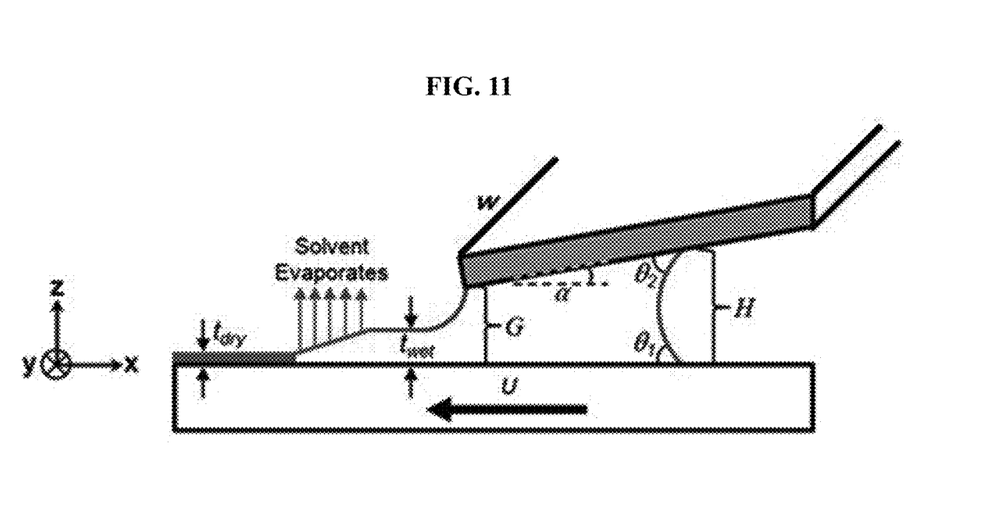
FIG. 11 shows a conceptual diagram of a bar coating method according to an embodiment of the present application.

In prior art, a nano-inorganic composition included 50% or more of $Na_2O$ (i.e., $x_1>=x_2+x_3$). In this composition, when the thickness of the coating film exceeds a certain threshold, it causes efflorescence and creates an air layer during the sintering process, as shown in FIGS. 1 and 8.

In an embodiment of the present application, a nano-inorganic compound is produced such that it satisfies $x_1<=x_2+x_3$. As shown in Examples 4 and 5, the nano-inorganic compound shows satisfactory results with respect to optical characteristics, hydrophilic characteristics, water resistance, and durability. The examples of the present application show that the optimal content of $Na_2O$ is within a range of 30±10% compared to X ($X=x_1+x_2+x_3$).

In addition, the examples of the present application show that a nano-inorganic compound with a molar ratio (y/X) of alkali metal oxide and silica in the range of 3 to 4 is the most stable, resistant to efflorescence, and water & heat resistant.

The examples of the present application (e.g., Examples 4 and 5) show that the ratio of the solid content ($M_2O+ySiO_2$) and the solvent (water+inorganic acid compound) of the nano-inorganic composition is significantly improved in terms of optical characteristics and durability when the solid content is 10 wt % or less.

With respect to solvent, phosphoric acid and/or boric acid may be included in the nano-inorganic compound in accordance with the required properties. When 2% or more of phosphoric acid and boric acid is added, a gel is formed, which does not meet the required properties of the nano-inorganic composition.

As shown in Formula 1, in the nano-inorganic composition (($x_1Na_2O+x_2K_2O+x_3Li_2O$)·$ySiO_2$), a nonmetallic element replaces a central metal atom so that a single bond between silicon (Si) and another atom becomes a double bond, forming a network structure. Then, a hydroxide ion (—OH) attached to silicate is substituted by another ion and dissociated from the silicate through a condensation reaction with the silicate, thereby preventing water penetration and improving water resistance. This is the mechanism through which the nano-inorganic composition has excellent water resistance.

Figure 7:
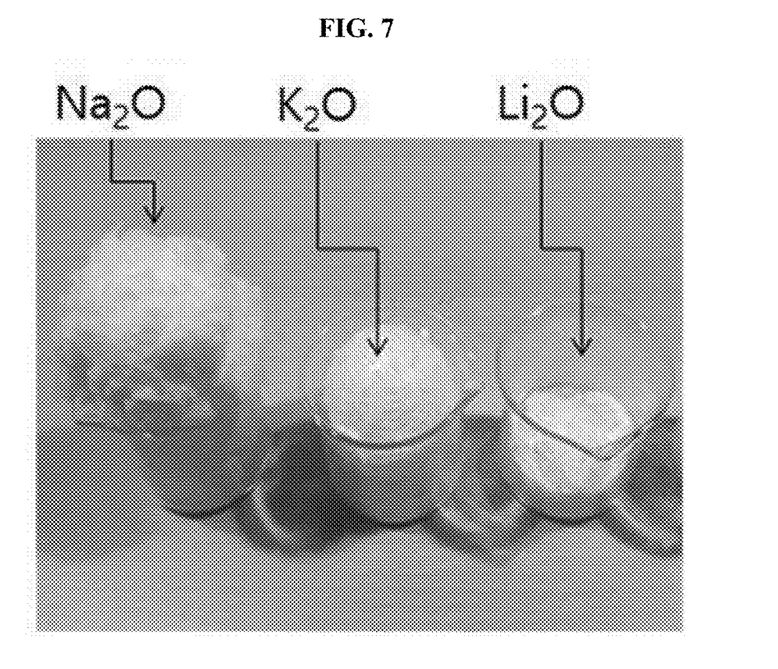
FIG. 7 shows a swelling phenomenon of each component according to an embodiment of the present application.

Also, as shown in FIG. 7, functionality of the nano-inorganic composition is optimized by controlling the content of metal oxides added, based on properties of each different metal oxide (e.g., volume change of the metal oxide) and/or required functionality.

In addition, a preferred pH range of the nano-inorganic composition is from 11 to 13. When the pH of the nano-inorganic composition is 11 or less, solidification occurs, causing difficulties in manufacturing; when the pH of the composition is 13 or more, various functionalities of the composition are reduced.

In addition, the contact angle of the thin film surface of the nano-inorganic composition is 20° or less, showing hydrophilic properties and thus, Easy-Clean properties.

In addition, the haze (turbidity) of the nano-inorganic composition may be controlled to make the surface glossy or matte, and in the case of a transparent substrate, various haze (turbidity) (e.g., translucent or opaque surfaces) may be implemented, thereby satisfying consumer needs.

In the present application, the scattering degree, haze, and turbidity represent a degree of transparency (or opacity) depending on the transparency of a transparent substrate, and may be used to indicate the degree of gloss of the coating surface (i.e., glossy or matte surface).

In an embodiment of the present application, when the nano-inorganic composition forms a coating film on a transparent substrate such as glass, the coating film may have 9 different levels of haze as follows: Haze Level 1 (transparent without haze, having a light transmittance of 80% or more), Haze Level 2 (light transmittance of about 70%), Haze Level 3 (light transmittance of about 60%), Haze Level 4 (light transmittance of about 50%), Haze Level 5 (light transmittance of about 40%), Haze Level 6 (light transmittance of about 30%), Haze Level 7 (light transmittance of about 20%), Haze Level 8 (light transmittance of about 10%), and Haze Level 9 (opaque). With this respect, the nano-inorganic composition of the present application may form a coating film of various haze levels, from Haze Level 1 to Haze Level 9.

EXAMPLES

Manufacturing of the Composition

The nano-inorganic composition according to the manufactured with a following present application was composition ratio.

As shown in Example 4, in order to manufacture 200 g of the nano-inorganic composition, the first composition (solid content; $SiO_2$, $Na_2O$, $K_2O$, and $Li_2O$) and the second composition ($H_2O$ and inorganic acid compound such as boric acid or phosphoric acid) are mixed. To manufacture the first composition, 1) $SiO_2$, $Na_2O$, $K_2O$, and $Li_2O$ are homogenously mixed such that $ySiO_2$=0.105 mol; $X(x_1+x_2+x_3)$ $M_2O$=0.027 mol; and a mole fraction of each alkali metal oxide ($Na_2O$, $K_2O$, and $Li_2O$) is $x_1$=33.8%, $x_2$=39.7%, and $x_3$=26.5%, respectively, or 2) silica ($SiO_2$) is homogenously mixed to each of sodium silicate, potassium silicate, and lithium silicate to achieve the above-mentioned mole fraction. The first composition is made such that the molar ratio of the solid content (y/x) is 3.885, and the solid content is 4.04 wt %. The second composition is made from 190.72 g of water ($H_2O$) and 1.2 g of the inorganic acid compound (phosphoric acid or boric acid). The first composition with the solid content of 4.04 wt % and the second composition (191.92 g) are mixed to make 200 g of the nano-inorganic composition according to the present application. The above-mentioned manufacturing procedure of the nano-inorganic composition involves making each of the first and second compositions separately and mixing the two compositions together (i.e., bicomposition type). Alternatively, the nano-inorganic composition may be manufactured in a following manner: when components of the first composition are mixed together to form the first composition, the second composition may be added (i.e., monocomposition type).

Substrates used in the present application may be one or more of various materials, such as metal, non-ferrous metal materials, other plastics (polymer materials), films, ceramics, tiles, stone materials, wood, and other substrates requiring paint coatings.

In the process of forming the coating film using the above-mentioned nano-inorganic composition, the step of pre-treating (or cleaning) the substrate needed to be coated (S200) is as important as the step of preparing the composition of Formula 1 (S100). The cleaning step is a very important process because during the coating process using the nano-inorganic composition, any foreign substance on the substrate surface may cause defects. The surface of the substrate may be cleaned with a typical alkali or neutral detergent, and if necessary, materials such as alcohol or acetone, or acid may be used for cleaning.

In addition, a method such as polishing may be used for cleaning as a pre-treatment before coating.

The cleaning process is especially important for transparent substrates, as defects caused by foreign substances remaining on a transparent substrate may greatly film after the film affect the quality of the coating formation.

After the cleaning process (S200) is completed, a drying step (S300) is conducted to remove water or moisture formed on the surface. Then, an attachment (of the coating composition) step (S400) is conducted to attach the nano-inorganic composition using various coating methods. Foreign materials may be in water or other media used for cleaning, and such foreign materials may remain on the substrate surface during the drying step. Thus, the surface needs to be cleanly dried using various methods such as air (wind) or heat to remove the foreign materials. When heat or high temperature is used, distilled water or other high-purity materials may be used such that foreign materials do not remain on the coating surface.

After the first drying step (S300) and the attachment step (S400) are completed as described above, it is necessary to dry or sinter the coated surface again. Heating with a high temperature of 100° C. or higher for sintering immediately after attaching the coating composition can cause problems such as air bubbles, as most of the water contained in the composition evaporates. Therefore, natural drying at room temperature or drying for a certain period of time at a temperature lower than 100° C. (S500) is required immediately after attaching the coating composition. After the second drying step (S500), a sintering step (S600) for heat treatment at 100 to 1000° C. is needed to ensure the durability of the coating. The sintering step (S600) is connected to the second drying step (S500) and is continuously controlled using a temperature controller.

In general, the heat treatment process (S600) is performed at a temperature less than 300° C., but in the case of a substrate with high operation temperature or a substrate used in a tough environment, heat treatment may be performed at 500° C. or higher.

If heat treatment is required at a temperature of 700° C. or higher (e.g., tempered glass), S600 may be replaced by a heat treatment process for glass tempering, immediately after the second drying step (S500).

The nano-inorganic composition of the present application is composed entirely of inorganic materials, and thus in general, heat treatment at a high temperature increases durability. In a good environment where temperature and humidity are controlled, the composition may be used right after the second drying step (S500), without the heat treatment process (S600).

The sintering step for heat treatment uses heat (temperature) energy to attach the coating composition to the substrate, and EM waves such as ultraviolet rays, infrared rays, or microwaves may be used. Alternatively, the coating composition may be cured and attached to the substrate at room temperature (i.e., natural curing). However, when curing is performed at room temperature, a longer curing duration is needed, and functionalities (e.g., durability) of the cured composition may be not as good as the composition that underwent heat treatment at higher temperature.

The heat treatment s requires at least 10 minutes of heat treatment (sintering), excluding the heat-up time. During a cooling process after the sintering, it is necessary to allow sufficient cooling time when coating a substrate that is very sensitive to temperature (e.g., glass or stone). When the heat treatment process was performed at a high temperature, it is recommended to cool the heat-treated composition to less than 100° C. before exposing the composition to the natural environment at room temperature. In particular, when coating a material sensitive to cooling temperature (e.g., glass and stone), a cooling step (S700) that controls the cooling time may be needed.

The process of forming a coating film is explained in further detail. After the step S100 of manufacturing the composition of Formula 1, the pre-treatment (cleaning) step S200 is conducted for the substrate needed to be coated. In general, a large amount of foreign materials (e.g., organic materials and oil) are produced when processing the substrate surface for coating. In order to remove such foreign materials, water cleaning, one of wet cleaning processes, is typically used. In case the water cleaning is difficult to apply, a dry cleaning process, such as plasma cleaning, is used.

Compared to the water cleaning (one of wet cleaning processes), the dry cleaning is a relatively simple process and has some benefits, such as hydrophilization of the substrate surface to form a coating film. In some cases, the plasma cleaning process is beneficial when the substrate surface needs to be treated in order to improve the attachment of the nano-inorganic composition to the substrate. However, under the plasma cleaning process, foreign materials may eventually remain on the substrate surface, so a cleaning process that can completely remove foreign materials from the substrate surface may need to be selected according to the substrate.

For a cleaning process, a cleaning agent may be used to remove foreign substances from the surface, and after using the cleaning agent, the cleaning agent should be completely removed (e.g., using air) so that surfactants in the cleaning agent and/or foreign substances do not remain on the surface.

In addition, polishing of the substrate surface may be performed according to the roughness of the substrate surface or the status of the foreign materials attached to the substrate. The surface polishing may be employed for the purpose of 1) improving the smoothness of the substrate to be coated and/or 2) when the substrate surface is severely contaminated or when foreign substances have permeated the substrate and are hard to remove, removing the contamination and/or the foreign substances.

In an embodiment according to the present application, since the nano-inorganic composition of the present application uses water as a solvent, the coating process of the substrate may further comprise, before forming an inorganic coating film using the nano-inorganic composition, an additional pre-treatment step such as plasma, anodizing, sanding, and etching so that the substrate surface may become more hydrophilic, thereby improving the attachment of the coating film to the substrate and rendering the formation of the inorganic coating film more efficient.

Ultrasonic cleaning may be used as one of the cleaning processes to clean the substrate surface. During the ultrasonic cleaning, the substrate is immersed in an ultrasonic tank, and ultrasonic waves are generated from the tank to clean even fine details of the substrate surface. The preferred frequency range of the ultrasonic waves is 28 to 48 KHz. In an embodiment according to the present application, during the ultrasonic cleaning process, a water-soluble cleaning agent including an inorganic salt may be used. Such water-soluble cleaning agent including an inorganic salt has some benefits in that the cleaning agent may improve adhesion of the inorganic coating film, formed on the surface of the substrate, to the substrate surface.

In an embodiment according to the present application, the process of forming the coating film using the nano-inorganic composition may further comprise, prior to the ultrasonic cleaning process described above, a deposition and steam-cleaning step of removing oil and impurities. This step may not be needed when the substrate surface is clean, but may be particularly preferred when it is difficult to remove impurities from the surface (e.g., wood or stone).

The deposition and steam-cleaning step is performed to remove various types of oil (e.g., mineral synthetic oil) attached to the substrate surface. In this step, 1) the substrate is placed into a tank, immersed in the solvent, and cleaned, or 2) the solvent is evaporated, the solvent vapor is condensed, and the condensed solvent flows on the substrate surface and cleans oil and impurities on the surface. Since the condensed solvent dries immediately after the substrate is taken out of the tank, the substrate may proceed to the next step without going through a separate drying step, hence shortening the manufacturing time.

In addition, after the cleaning step, a drying step (S300) for removing water or moisture formed on the surface may be conducted, and when drying the substrate surface using air or heat, the drying step may be conducted using pre-heated air, heated to a predetermined temperature.

The drying step (S300) is a process of removing water or moisture from the substrate surface. In one embodiment of the present application, dried air may be used after removing moisture from the air (e.g., during summer). In another embodiment of the present application, when the ambient temperature is low and the humidity is low (e.g., during winter), the air can be preheated to a temperature of about 50±20° C. for the drying step. The warm temperature above room temperature transferred from the preheated air to the substrate surface may be used in the coating process to either 1) produce haze for a transparent substrate or 2) selectively control the degree of gloss (e.g., a glossy or matte surface) for an opaque substrate, thereby efficiently forming a coating using the nano-inorganic composition.

In another example, the preheated air may be not utilized to implement haze and/or a glossy or matte surface. Instead, one may control the degree of the haze (turbidity) of the surface and/or implement a glossy or matte surface by heating the substrate surface above room temperature. As the temperature of the substrate surface becomes higher, the degree or level of the haze (turbidity) becomes higher as well.

After the pre-treatment (S200) and the pre-heating/drying (S300) of the substrate surface are completed, the coating step (S400) is performed to attach the nano-inorganic composition to the substrate surface.

The coating method of the nano-inorganic composition may include, and not be limited to, one or more of known methods such as dipping coating, spray coating, roll coating, spin coating, bar coating, flow coating, curtain coating, knife coating, vacuum deposition, ion plating, plasma deposition, sputtering, screen printing, application using a brush or a sponge, and application using a brush or a soft cloth. Any one of the above methods may be used, or more than one of the above methods may be used simultaneously, to form a coating film on the substrate surface using the nano-inorganic composition.

The coating film of the nano-inorganic composition, configured to be coated on the substrate surface, preferably has a thickness in the range of 10 nm to 5 μm. Any one or more of the above-mentioned coating methods may be controlled to produce a coating film with a thickness within the preferred range, depending on the use of the coating.

In one embodiment of the present application, the steps from S200 or S300 to S600 may be conducted more than once to increase the thickness of the coating film, thereby improving chemical stability (e.g., corrosion resistance) and mechanical properties.

After the nano-inorganic composition is coated on the surface via the above coating step (S400), the substrate sintering step (S600) is conducted at a predetermined temperature for a predetermined duration to completely cure the nano-inorganic composition.

Regarding the step of sintering the dried substrate (S600), although a preferable sintering condition may vary depending on the substrate type, a preferred sintering temperature and a preferred sintering duration, which may improve the hardness and the surface roughness of the coating film without significantly affecting the substrate itself, may be in the range of 100° C. to 1000° C. and in the range of 10 minutes to 3 hours, respectively. A typical sintering temperature is less than 300° C. (i.e., in an embodiment of the present application, the coating film is heat-treated at a temperature less than 300° C.). However, when the substrate is coated under a particularly poor environment (e.g., exposed to water, salt water, and/or strong acid), the coating film may be sintered at a temperature of 500° C. or higher and/or heat-treated for 3 hours or more to increase water resistance and durability.

The above sintering step may be divided into substages of a primary sintering step (S500), a secondary sintering step (S600), and a cooling step (S700).

First, the substrate on which the coating film is formed is placed into a furnace, and the temperature inside the furnace is gradually increased at a rate of about 3 to 5° C./min. When the temperature inside the furnace reaches the first sintering temperature (100±20° C.), the temperature is not increased any more, and the primary sintering process (S500) is conducted for a predetermined duration while maintaining the temperature inside the furnace at the first sintering temperature. A preferable range of the first sintering temperature is 100±20° C.

The purpose of the primary sintering step as described above is to prevent water vapor from damaging the coating film. Water is used as a solvent for the nano-inorganic composition of this application. If the temperature is suddenly increased from a high temperature, of 100° C. or higher or if water (i.e., solvent) is exposed to an environment with temperature of 100° C. or higher, the water constituting the nano-inorganic composition may vaporize to form an air layer in the coating film, as shown in FIG. 1, or cause a defect during the heat treatment. In order to prevent this, the rate of temperature increase may be slowed down, or a primary sintering process may be conducted at a temperature of about 100±20° C. for a duration of about several minutes to tens of minutes, so that the water present in the nano-inorganic composition is released to the outside during the heat treatment.

After the primary sintering process, the temperature inside the furnace may be slowly raised again. When the temperature inside the furnace reaches the second sintering temperature, the secondary sintering process is performed for a predetermined period of time while maintaining the temperature inside the furnace at the second sintering temperature without increasing the temperature any more. A preferable range of the second sintering temperature is 100° C. to 1000° C.

A temperature increase to 1,000° C. or higher is not problematic for the nano-inorganic composition, as the temperature of 1,000° C. or higher typically does not cause physical or chemical problems to the composition. However, most substrates may be degraded by heat (temperature), depending on the substrate type, so it is necessary to carefully examine the temperature characteristics of the substrate before sintering at a temperature of 1,000° C. or higher.

After the first and second sintering processes (S500, S600) are completed, a cooling process (S700), during which the sintered substrate is cooled down to room temperature, is conducted. In this cooling step S700, the substrate is not subject to a special treatment, but the temperature of the substrate is lowered to room temperature. In an embodiment of the present application, similar to the primary and secondary sintering processes, the cooling process may be controlled such that the temperature may be lowered at a fixed rate, or the substrate may be naturally cooled.

The sintering temperature may be selected differently depending on the material of the substrate, as different substrates have different thermal expansion characteristics between the substrate and the coating film. Thus, the sintering temperature may be selected based on the substrate to reduce the thermal shock caused by cooling.

In particular, in case of a temperature-sensitive substrate such as glass or stone, when the temperature-sensitive substrate is exposed directly to room temperature after being heat-treated to a temperature of 100° C. or higher, defects such as microcracks may occur on the surface, or the substrate may break. Thus, caution is required for such a substrate.

Examples of forming coating films using the nano-inorganic composition of the present application are described as follows, using different coating methods depending on the substrates.

In case of a plate substrate such as steel, glass, stone, or wood, a spray coating method or a bar coating method is a typical coating method and may be suitable for automation for mass production.

In an embodiment according to the present application, one or more of parameters (e.g., the height, the flow rate, the moving speed, the solid content, and the air pressure of the nozzle) may be controlled to form a coating film with an optimal thickness.

As the height of the nozzle increases, the amount of the composition attached to the substrate surface per unit area decreases, reducing the thickness of the coating film. On the contrary, as the height of the nozzle decreases, the amount of the composition attached to the substrate surface per unit area increases, increasing the thickness of the coating film. When the moving speed of the substrate increases, the amount of the composition attached decreases, and as the moving speed decreases, the amount of the composition attached increases. In addition, when the solid content is low, the coating thickness decreases, and when the solid content is high, the coating thickness increases. Surface turbidity may also be adjusted by controlling the air pressure of the nozzle (i.e., the composition ejected to the substrate surface).

Further, the flow rate of the composition may be adjusted to control the state and thickness of the coating film.

After the washing step (S200) for pre-treatment of the plate substrate, the formation of a coating film may be performed for a substrate surface area of 100*100 mm, with the height of the nozzle of 100 mm, the flow rate of 1,000 ul/min, the moving speed of the substrate of 0.25 m/min, and the moving speed of the nozzle of 20 m/min. Under the above-mentioned conditions and at the ambient temperature of 25±5° C. and humidity of 40-60%, a coating film with a thickness of 200-500 nm may be formed. In order to increase the thickness of the coating film, coating may be done more than once under the same conditions described above.

In the present application, the unit area means an area of 100*100 mm.

One or more of the above-mentioned parameters may be adjusted depending on environmental conditions. For example, if the humidity is 40% or lower, the flow rate may be increased, and if the humidity is 60% or higher, the flow rate may be decreased, to ensure that the thickness and the surface condition of the coating film is constant and uniform. If the substrate has a surface that absorbs water (e.g., stone or wood), the flow rate may be increased accordingly, to form a coating with film an optimal thickness.

Examples of forming a coating film using the spray coating method are described as follows.

In an embodiment of the present application, the spray coating method is used to produce a coating film on the substrate surface, and the following formula may be used to calculate the thickness of the coating film.

In an embodiment of the present application, the relationship between the parameters of the spray coating method and the thickness of the coating film is as follows.

$$H_r \approx QCt/UWh$$

$H_r$: coating thickness
Q: flow rate (ul/min)
C: viscosity or concentration (solid content)
U: moving speed of substrate (m/min)
t: the number of coatings
W: spray area (m$^2$)
h: height of nozzle (m)

For a plate coating of a 0.1 m×0.1 m substrate, a coating film with a wide range of thickness may be formed by adjusting one or more parameters such as the flow rate (100 ul/min-10,000 ul/min), viscosity (1-10 cp), the moving speed of the substrate (0.1-5 m/min), the moving speed of the nozzle (10-50 m/min), the height of the nozzle (0.05-1 m), and the number of coatings. In the above formula, coating is done with the air pressure (for controlling the flow rate) set to a predetermined value (i.e., static pressure). When the air pressure is 0.5 Mpa or greater, haze (turbidity) may be produced in the case of a transparent glass substrate, and in case of the a non-transparent substrate, transmittance may be lowered, and the substrate may become translucent or opaque.

In an embodiment of the present application, when the nano-inorganic composition forms a coating film on a transparent substrate such as glass, the coating film may have 9 different levels of haze as follows: Haze Level 1 (transparent without haze (e.g., a typical, transparent, clean glass); having a light transmittance of 808 or more), Haze Level 2 (light transmittance of about 70%), Haze Level. 3 (light transmittance of about 60%), Haze Level 4 (light transmittance of about 50%), Haze Level 5 (light transmittance of about 40%), Haze Level 6 (light transmittance of about 30%), Haze Level 7 (light transmittance of about 20%), Haze Level 8 (light transmittance of about 10%), and Haze Level 9 (opaque). With this respect, the nano-inorganic composition of the present application may form a coating film with a wide range of haze (i.e., from Haze Level 1 to Haze Level 9).

The following equation is a proportional equation related to the degree of scattering (haze).

$$S \approx CPTt/UWh$$

S: degree of scattering (haze or turbidity) at a constant flow rate
C: viscosity or concentration (solid content)
P: air pressure
U: moving speed of substrate (m/min)
T: surface temperature of substrate
t: the number of coatings
W: spray area (m$^2$)
h: height of nozzle (m)

For a plate coating of a 0.1 m×0.1 m glass substrate, a coating film with a wide range of haze (turbidity) may be formed by adjusting one or more parameters such as the air pressure (0.1 Mpa-1 Mpa), viscosity (1-10 cp), the moving speed of the substrate (0.1-5 m/min), the moving speed of the nozzle (10-50 m/min), and the height of the nozzle (0.1-0.5 m), assuming an ambient temperature of 25±5° C., humidity of 40-60%, and the surface temperature of substrate equal to room temperature. Under the above conditions, if the flow rate is equal to or greater than a certain value (e.g., 3,000 ul/min or greater), the coating film may become transparent again, so precise control is needed. In addition, as the air pressure increases, a greater amount of liquid raw materials is decomposed due to pressure, which in turn increases the haze (turbidity) of the coating film. The above formula also shows that the viscosity or concentration of the composition is in a proportional relationship with the degree of scattering.

In the case of a glass substrate, the spray coating method is suitable for producing a coating film with haze. In order to manufacture a clear and clean coating film on the glass substrate, the slot die coating method or the bar coating method is advantageous in that constant surface roughness may be maintained, as compared to the spray coating method.

In an embodiment according to the present application, the temperature of the substrate surface and/or the environmental conditions (e.g., temperature and humidity) may be adjusted to control the haze.

In other words, as the temperature of the substrate surface is increased above room temperature, the degree of scattering (haze or turbidity) may increase given that other conditions are the same. In another embodiment, the degree of scattering (haze or turbidity) may be increased by increasing the ambient temperature. In order to preserve the clear properties of glass, the slot die coating method or the bar coating method may be used instead of the spray coating method, which is difficult to control.

The slot die coating method or the bar coating method places a slot or a bar, respectively, apart from the coating surface by tens to hundreds of micrometers, thereby forming a meniscus and attaching the composition to the surface to be coated. In an embodiment of the present application, in order to coat the substrate surface with a coating film having a thickness of 100 nm on a glass sample with a size of 100 mm×100 mm, the bar or the slot die may be vertically spaced apart from the substrate surface by about 100±50 μm, and the flow rate (i.e., injection rate) into the bar or the slot die may be set to about 50-500 ul/min, and the moving speed of the substrate may be about 1-10 mm/sec.

The thickness of the coating film may be adjusted by controlling one or more parameters such as the height of the bar or the slot die, the flow rate, the moving speed, and the solid content of the composition.

The equation showing the relationships among conditions or parameters for the bar coating or the slot die coating is as follows.

W: bar length
Twet: actual coating thickness at the end of the meniscus
U: moving speed of substrate
Q: flow rate (the amount of solution consumed at the meniscus during coating)
n: the number of needles for solution injection.
L: radius of curvature of the meniscus
Y: surface tension
μ: solution viscosity
H: bar height
$t_{dry}$: thickness of the coating film after drying Assuming that the amount of the solution consumed at the meniscus during coating is equal to the amount newly injected, this relationship can be expressed by the following equation:

$$W \cdot Twet \cdot U = Q$$

Considering the number of needles used to inject the composition, which are to be added as the coating area increases, the above relationship can be expressed by the following equation:

$$W.Twet.U = n.Qn$$

$$Qn = \frac{\pi D^2}{4} \cdot Us$$

D: inner diameter of the syringe
Us: injection speed of composition

According to Landau Levich theory, the following equation may be used:

$$Twet \approx \frac{n \cdot Qn}{W \cdot U} \cdot \frac{1}{L} \approx C_1 \left(\frac{\mu U}{\gamma}\right)^{\frac{2}{3}}$$

wherein $L = \frac{H}{\cos\theta_1 + \cos\theta_2}$.

Rearranging the above relationship results in the following equation.

$$\frac{n \cdot Qn}{W \cdot U} \approx Twet$$

Combining all the equations shown above, the following equation may be derived.

$$Twet \approx \frac{n \cdot Qn}{W \cdot U} \cdot \frac{1}{L} \approx C_1 \left(\frac{\mu U}{\gamma}\right)^{\frac{2}{3}}$$

In other words, it can be derived from the above equation that Twet, an actual coating thickness at the end of the meniscus, is proportional to the number of the needles and the flow rate and is inversely proportional to the bar length and the injection rate of the composition, and C1 a constant related to the dynamic meniscus coverage.

Unlike the spray coating, in the case of the bar coating or the slot die coating, it is not easy to more than double the thickness by adjusting one or more parameters excluding solid content. On the other hand, the bar coating or the slot die coating, which can implement a thin film thickness and a relatively uniform surface, may prove useful as a coating method for improving light transmittance, among various optical properties.

After the coating step (S400) for attaching the nano-inorganic composition as described above is completed, a sintering step is performed.

As described above, sintering is conducted through two steps: primary and secondary sintering processes. However, depending on substrates, sintering may be conducted without multiple steps, and in an embodiment of the present application, the sintering temperature may also be adjusted.

For example, depending on substrates (e.g., temperature-sensitive substrates such as film, stone, and wood), it may be more effective to heat-treat only the surface on which the coating film is formed, instead of heat-treating the entire substrate after placing the substrate inside a furnace. In this case, only the substrate surface may be heat-treated using microwaves, UV curing, and/or infrared (middle infrared, MIR).

For substrates (e.g., films) made of polymer materials, depending on the substrate shape, if a coating method such as roll coating, spray coating, and dipping coating is available, the substrate may be coated on one side or on both sides. In an embodiment of the present application, the coating materials may be attached to the polymer materials, and then the substrate may be immediately sintered using microwaves to form a coating on the polymer materials with a wide range of thickness. In this way, various characteristics of inorganic materials can be utilized for substrates of various shapes. By attaching the coating films to industrial materials that have been already installed, the scope of use may be diversified.

1. Pencil Hardness

The pencil hardness was measured according to the standard of ASTM D3363.

It was measured by mounting a testing pencil in a pencil hardness tester and applying a certain load (1 kg). The measurement results are designated as one of 9H-1H, F, HB, and 1B-6B, with 9H being the hardest and 6B being the weakest hardness.

2. Adhesion or Adherence

Adhesion was measured according to the standard of ASTM D3359.

Using a cutter, checkerboard-shaped defects were formed on the coating film of the nano-inorganic composition. Then, the 3M tape was completely attached to the coating film and then was removed with a constant force to observe the degree of adhesion between the coating film and the substrate. The measurement results were described as one of 0B, 1B, 2B, 3B, 4B, and 5B, and the results are as follows.

0B: 65% or more of the coating film is damaged after the adhesion test.

1B: about 35-65% of the coating film is damaged after the adhesion test.

2B: about 15-35% of the coating film is damaged after the adhesion test.

3B: about 5-15% of the coating film is damaged after the adhesion test.

4B: less than 5% of the coating film is damaged after the adhesion test.

5B: the coating film is not damaged after the adhesion test.

3. Pollution Resistance (Easy-Clean)

After an oil marker was painted on the coating film, water (tap water) was sprayed thereon. Then, how much of the oil marker was removed from the coating film was measured. Measurements were made 10 consecutive times for one data point, and the results were indicated as follows. ◎: very good, ○: good, Δ: fair, and X: poor.

4. Contact Angle

After dropping a drop of water on the coating film, how the shape of the water droplet on the coating film changed was observed. This experiment measures the degree of hydrophilicity of the coating film, and if the coating film is superhydrophilic or hydrophilic, the film has superior easy-clean characteristics (i.e., superior pollution resistance). The coating film is determined to be hydrophilic when the contact angle is about 2015 degrees, and superhydrophilic when the contact angle is about 10±2 degrees.

5. Water Resistance

After placing the substrate at a temperature of 90° C. for 12 hours, the condition of the coating film was measured. ◎: very good, ○: good, Δ: fair, and X: poor.

6. Transmittance

Using the UV-Visible Spectrometer, the transmittance of the coating film coated on a glass plate was measured from the visible light region to the ultraviolet region.

Examples 1, 2, 3, and 5 were made using the same methods as Example 4 described above, but with 1) different molar ratios of alkali oxide metal ($M_2O$) to silica ($SiO_2$) and 2) different molar fractions of the alkali oxide metals ($x_1$, $x_2$, $x_3$), as shown in [TABLE 1] below.

Table 2 shows high functionalities of the coating film, after coating the substrate using the coating composition manufactured according to this application.

TABLE 1

| | | | Production of 200g | | | | |
|---|---|---|---|---|---|---|---|
| | | Components | Example 1(parts by weight) | Example 2(parts by weight) | Example 3(parts by weight) | Example 4(parts by weight) | Example 5(parts by weight) |
| | | $ySiO2$ (number of moles) | 0.3327 | 0.3216 | 0.3206 | 0.105 | 0.206 |
| | | $x1 + x2 + x3$ (number of moles) | 0.0916 | 0.0847 | 0.0818 | 0.027 | 0.051 |
| Solids | $M_2O$ mole fraction | $Na_2O$ | 0.5151 | 0.416 | 0.417 | 0.338 | 0.28 |
| | | $K_2O$ | 0.3031 | 0.334 | 0.214 | 0.397 | 0.38 |
| | | $Li_2O$ | 0.1818 | 0.25 | 0.369 | 0.265 | 0.34 |
| | | Mole fraction total | 1 | 1 | 1 | 1 | 1 |

TABLE 1-continued

| | | Production of 200g | | | | |
|---|---|---|---|---|---|---|
| | Components | Example 1(parts by weight) | Example 2(parts by weight) | Example 3parts by weight) | Example 4(parts by weight) | Example 5(parts by weight) |
| | Molar ratio (y/x) | 3.63 | 3.7968 | 3.9213 | 3.885 | 4.0179 |
| | Solid content wt % ($m_2O + SiO_2$) | 13.01 | 12.4 | 11.96 | 4.04 | 7.8 |
| Solvent | $H_2O$ | 173.37 | 174.20 | 175.17 | 190.72 | 183.79 |
| | Inorganic acid compound (phosphoric acid or boric acid) | 0.6 | 1 | 0.9 | 1.2 | 0.6 |
| | Total | 173.97 | 175.20 | 176.07 | 191.92 | 184.39 |
| | Total (Solids + Solvent) | 200 | 200 | 200 | 200 | 200 |

TABLE 2

| Measurements | Example 1 | Example 2 | Example 3 | Example 4 | Example 5 |
|---|---|---|---|---|---|
| Pencil hardness | 9 H | 9 H | 9 H | 9 H | 9 H |
| Adhesion | 5 B | 5 B | 5 B | 5 B | 5 B |
| Easy-clean | ◎ | ◎ | ◎ | ◎ | ◎ |
| Light transmittance | ≤1% improved | ≤1% improved | ≥1% improved | ≥2% improved | ≥2% improved |
| Contact angle | 23.2/ hydrophilic | 20.7/ hydrophilic | 12.4/ hydrophilic | 7.8/ super-hydrophilic | 9.3/ super-hydrophilic |
| Water resistance | ○ | ○ | ○ | ◎ | ◎ |

The present application describes an industrially applicable invention related to the production of novel nano-materials and coating methods using such materials.

What is claimed is:

1. A nano-inorganic composition, comprising:
    at least one of sodium oxide ($Na_2O$), potassium oxide ($K_2O$), and lithium oxide ($Li_2O$), all of which are alkali metal oxide ($M_2O$), as represented by Formula 1;
    an inorganic acid compound:
    water ($H_2O$); and
    at least one of a dispersant, a catalyst, and a surfactant:

$$(x_1Na_2O+x_2K_2O+x_3Li_2O) \cdot ySiO_2 \cdot nH_2O \quad \text{[Formula 1]}$$

wherein $x_1$ is the number of moles of $Na_2O$;
    $x_2$ is the number of moles of $K_2O$;
    $x_3$ is the number of moles of $Li_2O$;
    $x_1, x_2, x_3 >= 0$;
    $x_1 <= x_2 + x_3$;
    $x_1 + x_2 + x_3 = X$ wherein X is the number of moles of the alkali metal oxides ($M_2O$), and $X > 0$;
    y is the number of moles of silica, and $y >= X$; and
    n is the number of moles of water; and n is a natural number from 1 to 20;
    wherein the nano-inorganic composition comprises 0.1-10 parts by weight of ($M_2O+ySiO_2$), 0.01-2 parts by weight of the inorganic acid compound, and the remaining parts by weight of water and the at least one of the dispersant, the catalyst, and the surfactant; and the pH of the nano-inorganic composition is from 11 to 13.

2. The nano-inorganic composition according to claim 1, wherein the inorganic acid compound is boric acid, phosphoric acid or a combination of boric acid and phosphoric acid.

3. The nano-inorganic composition according to claim 1, wherein a coating film thickness of the nano-inorganic composition is less than or equal to 5 μm;
    a coating film surface of the nano-inorganic composition is hydrophilic and has a contact angle less than or equal to 20°; and
    a coating film surface of the nano-inorganic composition has an easy-clean characteristic.

4. The nano-inorganic composition according to claim 3, wherein an optical characteristic is improved by more than or equal to 2% via the coating film thickness.

* * * * *